United States Patent
Benamar

(10) Patent No.: US 11,897,383 B2
(45) Date of Patent: *Feb. 13, 2024

(54) METHOD FOR CONTROLLING A MOTOR VEHICLE LIGHTING SYSTEM

(71) Applicant: VALEO VISION, Bobigny (FR)

(72) Inventor: Fatima Benamar, Bobigny (FR)

(73) Assignee: Valeo Vision, Bobigny (FR)

(*) Notice: Subject to any disclaimer, the term of this patent is extended or adjusted under 35 U.S.C. 154(b) by 0 days.

This patent is subject to a terminal disclaimer.

(21) Appl. No.: 17/785,084

(22) PCT Filed: Dec. 10, 2020

(86) PCT No.: PCT/EP2020/085598
§ 371 (c)(1),
(2) Date: Jun. 14, 2022

(87) PCT Pub. No.: WO2021/122329
PCT Pub. Date: Jun. 24, 2021

(65) Prior Publication Data
US 2023/0051036 A1    Feb. 16, 2023

(30) Foreign Application Priority Data

Dec. 16, 2019   (FR) ..................... 1914495

(51) Int. Cl.
*B60Q 1/14*    (2006.01)
*G06V 10/141*   (2022.01)
(Continued)

(52) U.S. Cl.
CPC .......... *B60Q 1/143* (2013.01); *B60Q 1/1423* (2013.01); *F21S 41/663* (2018.01);
(Continued)

(58) Field of Classification Search
CPC ................ B60Q 2300/132; B60Q 1/10; B60Q 2300/112; B60Q 2300/136;
(Continued)

(56) References Cited

U.S. PATENT DOCUMENTS

2003/0028291 A1* 2/2003 Matsuura ............... G06V 20/58
356/3
2014/0085468 A1* 3/2014 Faber ..................... H04N 7/183
348/148
(Continued)

FOREIGN PATENT DOCUMENTS

DE  102011006570 A1  10/2012
DE  102012200048 A1   7/2013
(Continued)

OTHER PUBLICATIONS

European Patent Office, International Search Report (with English translation) and Written Opinion of corresponding International Application No. PCT/EP2020/085598, dated Jan. 14, 2021.

*Primary Examiner* — Wei (Victor) Y Chan
(74) *Attorney, Agent, or Firm* — Valeo Vision

(57) ABSTRACT

Method for controlling a lighting system with the lighting system including a plurality of light sources, wherein each light source is capable of emitting an elementary light beam with the vertical angular aperture of which is less than 1°. The method includes detecting a target object, determining a relative distance between a given point of the host vehicle sensor system and a detected point of the target object and determining a gradient of the road on which the target object is located, determining a lower angle and an upper angle between a given point of the host vehicle lighting system and a high cut-off point and a low cut-off point, controlling the light sources of the host vehicle lighting system in order to emit a pixelated light beam of the driving beam type in order (Continued)

to generate a dark zone extending substantially between the high and low cut-off points.

10 Claims, 2 Drawing Sheets

(51) Int. Cl.
*F21S 41/663* (2018.01)
*F21W 102/155* (2018.01)
*F21W 102/14* (2018.01)
*B60Q 1/10* (2006.01)

(52) U.S. Cl.
CPC ...... *G06V 10/141* (2022.01); *B60Q 2300/056* (2013.01); *B60Q 2300/324* (2013.01); *B60Q 2300/41* (2013.01); *F21W 2102/14* (2018.01); *F21W 2102/155* (2018.01)

(58) Field of Classification Search
CPC .... B60Q 2300/324; B60Q 1/115; B60Q 1/12; B60Q 1/122
See application file for complete search history.

(56) References Cited

U.S. PATENT DOCUMENTS

| | | |
|---|---|---|
| 2014/0219506 A1 | 8/2014 | Foltin |
| 2015/0151669 A1 | 6/2015 | Meisner et al. |
| 2015/0253426 A1* | 9/2015 | Yasugi .................. G01S 7/4813 356/4.07 |
| 2016/0009217 A1* | 1/2016 | Dierks .................... B60Q 1/16 701/49 |
| 2016/0167567 A1* | 6/2016 | Foltin .................... B60Q 1/143 315/82 |
| 2017/0144587 A1* | 5/2017 | Ogawa ................. B60Q 1/0023 |
| 2017/0291529 A1* | 10/2017 | Schneider ............ B60Q 1/0035 |
| 2020/0398737 A1* | 12/2020 | Fujiyama ................ G01S 17/86 |

FOREIGN PATENT DOCUMENTS

| | | |
|---|---|---|
| EP | 2700537 A1 | 4/2014 |
| EP | 3517362 A1 | 7/2019 |
| JP | 2015214281 A | 12/2015 |
| WO | 2014184634 A2 | 11/2014 |

\* cited by examiner

METHOD FOR CONTROLLING A MOTOR VEHICLE LIGHTING SYSTEM

CROSS-REFERENCE TO RELATED APPLICATIONS

This application is filed under 35 U.S.C. § 371 U.S. National Phase of International Application No. PCT/EP2020/085598 filed Dec. 10, 2020 (published as WO2021122329), which claims priority benefit to French application No. 1914495 filed on Dec. 16, 2019, the disclosures of which are herein incorporated by reference in their entirety.

TECHNICAL FIELD

The invention relates to the field of motor-vehicle lighting. More specifically, the invention relates to a method for controlling a lighting system of a motor vehicle so as to produce a pixelated high light beam that does not cause discomfort glare.

BACKGROUND OF THE INVENTION

It is known practice to equip motor vehicles with a sensor system for detecting, on the road, a target object that is not to be subjected to discomfort glare, and with a lighting system for emitting, depending on the position of this object, a beam that does not cause discom-fort glare.

BRIEF SUMMARY OF THE INVENTION

To that end, these lighting systems are capable of emitting a horizontally segmented road-illuminating beam and are provided with a control unit capable of turning on and/or turning off and/or modifying the light intensity of each of the elementary light beams forming the segments of this beam. It is thus known practice to control this type of lighting system so as to turn off a light segment that extends vertically right through the illuminating beam, and that is centered on the target object. Such lighting systems are thus able to illuminate the road more brightly than a conventional low illuminating beam, without causing other road users discomfort glare.

However, the technologies of recent lighting systems allow a horizontally and vertically pixelated beam the vertical resolution of which is particularly high to be emitted. With this type of technology, it would be advantageous to be able to control the lighting system so as to generate a pixelated road-illuminating beam featuring a dark region level with the target object while still lighting above and below this dark region. Specifically, such a pixelated illuminating beam, unlike a beam controlled in a segmented manner, would allow the driver to perceive gantry-type traffic signs or to perceive objects on the road or road markings in the near field, or indeed the driver not to be distracted as the dark region moves in the illuminating beam to track the target object as it moves.

There is thus a need for a method that would make it possible to control the generation of this dark region in such a pixelated beam, such as to give said region upper and lower cut-offs bordering the target object, while still lighting above and below this target object. The present invention aims to meet this need.

To these ends, one subject of the invention is a method for controlling a lighting system of a host motor vehicle, the lighting system comprising a plurality of selectively controllable elementary light sources, each elementary light source being able to emit an elementary light beam the vertical opening angle of which is smaller than 1°, the method comprising the following steps:

detecting a target object by means of a sensor system of the host vehicle;

determining a relative distance between a given point of the sensor system of the host vehicle and a detected point of the target object and determining a slope of the road on which the target object is located;

determining, on the basis of said relative distance and of said slope, a lower angle and an upper angle between a given point of the lighting system of the host vehicle and an upper cut-off and a lower cut-off that are together intended to vertically border the target object, respectively;

controlling the elementary light sources of the lighting system of the host vehicle so as to emit a pixelated high light beam, some of the elementary light sources being controlled, depending on said lower and upper angles, to generate, in the light beam, a dark region extending substantially between said upper and lower cut-offs.

It will be understood that, by virtue of the invention, it is possible to turn off certain pixels in a pixelated light beam emitted by the lighting system of the host vehicle, so as to form a dark region the upper and lower cut-offs of which frame or border the target object, the positions of these cut-offs being defined on the basis of information relating to the slope of the road over which the target object and the host vehicle are traveling.

Advantageously, the step of detecting the target object may be carried out using a device such as a laser scanner or a LIDAR (LIDAR standing for Light Detection And Ranging) equipped with an emitter/receiver of light and with a computer capable of measuring the time of flight of the emitted light received after reflection from an object, with a view to detecting the presence of said object. Where appropriate, said relative distance may be determined by this computer by means of said measured time of flight.

Advantageously, the information relating to the slope may be obtained by means of a navigation system of the host vehicle, in combination with the relative distance.

Preferably, the method comprises an intermediate step of comparing said slope with a lower threshold and an upper threshold, the execution of the step of determining the lower and upper angles being conditional on said slope being comprised between the lower threshold and the upper threshold. The lower threshold will possibly for example be a slope greater than −15%, and in particular equal to −13%. The upper threshold will for example be a slope less than +15%, and in particular equal to +13%. The reasoning behind this comparing step is that adaptive road-illuminating functions can be activated only when the host vehicle is traveling at a sufficiently high speed. Thus, it has been observed that, given the slopes of roads over which motor vehicles are likely to travel at high speed, it is not necessary to generate a dark region in the pixelated light beam when the slope of the road is not comprised in the interval of the lower and upper thresholds, since the host vehicle cannot in this case travel at a sufficient speed to allow the adaptive road-illuminating function to be activated.

Advantageously, the method comprises a step of determining, on the basis of said relative distance and of said slope, a relative height between said given point of the lighting system of the host vehicle and a given point of the target object at which said lower cut-off must be positioned, the lower and upper angles being determined on the basis of said relative distance, of said slope and of said relative height. Where appropriate, the method may comprise a step of determining the relative height further being determined by means of said distance to the start of the slope. This distance may in particular be obtained by means of the navigation system of the host vehicle. If so desired, the method comprises a step of determining the height of a light source of the target object, such as a rear light or a headlamp of a target vehicle, the relative height being determined by means of said height. As a variant, said height of the light source of the target object may be predetermined. For example, said relative height may be obtained by means of the following equation:

$$Z_C = \frac{H_{HL}}{\sin(\frac{\pi}{2} - S)} + \tan(S) \cdot (X_{HC} - X_S) + H_H \quad \text{[Math 1]}$$

where $Z_C$ is the relative height between the host vehicle and the target object, $H_{HL}$ is the height of a light source of the target object, S is the slope of the road on which the target object is located, $X_{HC}$ is the distance separating the host vehicle and the target object, $X_S$ is the distance separating the host vehicle from the start of the slope of the road on which the target object is located and $H_H$ is the height of the sensor system of the host vehicle.

Advantageously, the step of determining said relative height is a step of determining a relative height between said given point of the lighting system of the host vehicle and said given point of the target object at which said lower cut-off must be positioned at a given time, and the method comprises a step of predicting a value of said relative height at a future time with respect to the given time. The given time may, for example, correspond to the time of detection of the target object by the sensor system, and the lower and upper angles may be determined on the basis of the value of said predicted relative height. This feature makes it possible to compensate for the latency in the sensor and lighting systems of the motor vehicle. Specifically, between the given time when the target object was detected by the sensor system and the time when the dark region is generated in the light beam emitted by the lighting system, the target object may have moved such that the dark region no longer substantially surrounds it and as a result the light beam may cause discomfort glare to be experienced thereby. Predicting the value of the relative height at a future time thus allows the upper and lower cut-offs of the dark region to be positioned around the position of the target object at this future time.

Where appropriate, the predicting step may comprise a step of determining a vertical speed of the target object, the value of the relative height at a future time being predicted using the vertical speed of the target object. For example, the vertical speed may be determined by differentiation of the determined value of the relative height with respect to time.

In one embodiment of the invention, the value of the lower angle is determined by means of said relative height and of said relative distance. For example, the value of the lower angle may be obtained by means of the following equation:

$$V_{inf} = \tan^{-1}(\frac{Z_C}{X_{HC}}) \quad \text{[Math 2]}$$

where $V_{inf}$ is the lower angle, $Z_C$ is the relative height between the host vehicle and the target object and $X_{HC}$ is the distance separating the host vehicle and the target object.

Advantageously, the method comprises a step of determining the height of the target object, the value of the upper angle being determined by means of the value of the lower angle and of said determined height.

Advantageously, the step of detecting the target object comprises classifying the type of the target object among a set of predetermined types of target object, and the height of the target object is determined depending on the classified type of target object. For example, the type of the object may be obtained by means of a method for processing signals acquired by the receiver of the sensor system and implemented by the computer of the sensor system. Where appropriate, the set of predetermined types of target object may in particular comprise a pedestrian, a bicycle, an automobile or a truck, each predetermined type of target object being associated with a predetermined target-object height.

As a variant, the height of the target object may be obtained by means of a method for processing images acquired by a camera of the sensor system of the host vehicle, which method is implemented by the computer of the sensor system.

For example, the value of the upper angle may be determined by means of the following equation:

$$V_{sup} = \tan^{-1}\left(\frac{H_C - H_{HL}}{X_{HC}}\right) + V_{inf} \quad \text{[Math 3]}$$

where $V_{sup}$ is the upper angle, $H_{HL}$ is the height of a light source of the target object, $X_{HC}$ is the distance separating the host vehicle and the target object, $H_c$ is the height of the target object and $V_{inf}$ is the value of the lower angle.

Advantageously, the step of controlling the elementary light sources of the lighting system of the host vehicle comprises turning off certain elementary light sources that are each capable of emitting one elementary light beam between the upper and lower cut-offs. For example, each elementary light source being able to emit a light beam with a given emission cone defined by its given opening angle and its direction of emission, the control step will possibly comprise a step of selecting the elementary light sources the emission cones of which are vertically at least partially comprised in the interval defined by the lower and upper angles. Where appropriate, the step of controlling the elementary light sources may comprise turning off certain elementary light sources that are each capable of emitting one elementary light beam between the upper and lower cut-offs and between lateral cut-offs bordering the target object. For example, two lateral angles, between a given point of the lighting system and left and right lateral cut-offs intended to laterally border the target object, respectively, will possibly be determined on the basis of a lateral angle between a given point of the sensor system and a detected point of the target object.

The invention also relates to a motor vehicle comprising a sensor system, a lighting system and a controller, the controller being arranged to implement the method according to one of the preceding claims.

Advantageously, the lighting system comprises a plurality of selectively controllable elementary light sources, each elementary light source being able to emit an elementary light beam the vertical opening angle of which is smaller than 1°. Where appropriate, all of the elementary light sources may be able to emit a pixelated light beam that lies vertically in a range from −1° to +5° about the horizon.

Advantageously, the elementary light sources are arranged such that the vertical opening angle of the elementary light beams that they are able to emit decreases with distance from the top of the pixelated light beam. If so desired, the lighting system may comprise:

a first plurality of selectively controllable elementary light sources, each able to emit one elementary light beam the vertical opening angle of which is substantially 0.25°, all of the sources of the first plurality of elementary light sources being able to emit a first pixelated light sub-beam lying vertically in a range from −1° to +1';

a second plurality of selectively controllable elementary light sources, each able to emit one elementary light beam the vertical opening angle of which is substantially 0.3°, all of the sources of the second plurality of elementary light sources being able to emit a second pixelated light sub-beam lying vertically in a range from +1° to +2°;

a third plurality of selectively controllable elementary light sources, each able to emit one elementary light beam the vertical opening angle of which is substantially 0.35°, all of the sources of the third plurality of elementary light sources being able to emit a third pixelated light sub-beam lying vertically in a range from +2° to +3°;

a fourth plurality of selectively controllable elementary light sources, each able to emit one elementary light beam the vertical opening angle of which is substantially 0.4°, all of the sources of the fourth plurality of elementary light sources being able to emit a fourth pixelated light sub-beam lying vertically in a range from +3° to +5°.

In one embodiment of the invention, the lighting system comprises: a light-emitting module comprising a pixelated light source comprising a plurality of elementary emitters arranged in a matrix array, each of the elementary emitters forming one elementary light source and being able to be activated selectively so as to emit one elementary light beam; and, associated with said pixelated light source, a projecting optical element for projecting each of said elementary light beams onto the road. For example, the pixelated light source comprises at least one matrix array of electroluminescent elements, and in particular at least one monolithic matrix array of electroluminescent elements (monolithic array).

As a variant, the light-emitting module may comprise a light source formed, for example, from at least one light-emitting diode and from a matrix array of optoelectronic elements, and for example a digital micromirror device (DMD) that directs the light rays output from said at least one light source by reflection toward a projecting optical element.

BRIEF DESCRIPTION OF THE DRAWINGS

The present invention will now be described by way of examples that are merely illustrative and that in no way limit the scope of the invention, and with reference to the accompanying illustrations, in which.

DETAILED DESCRIPTION OF THE INVENTION

In the following description, elements that are identical in terms of structure or in terms of function and that appear in various figures have been designated with the same reference, unless otherwise indicated.

Figure 1:
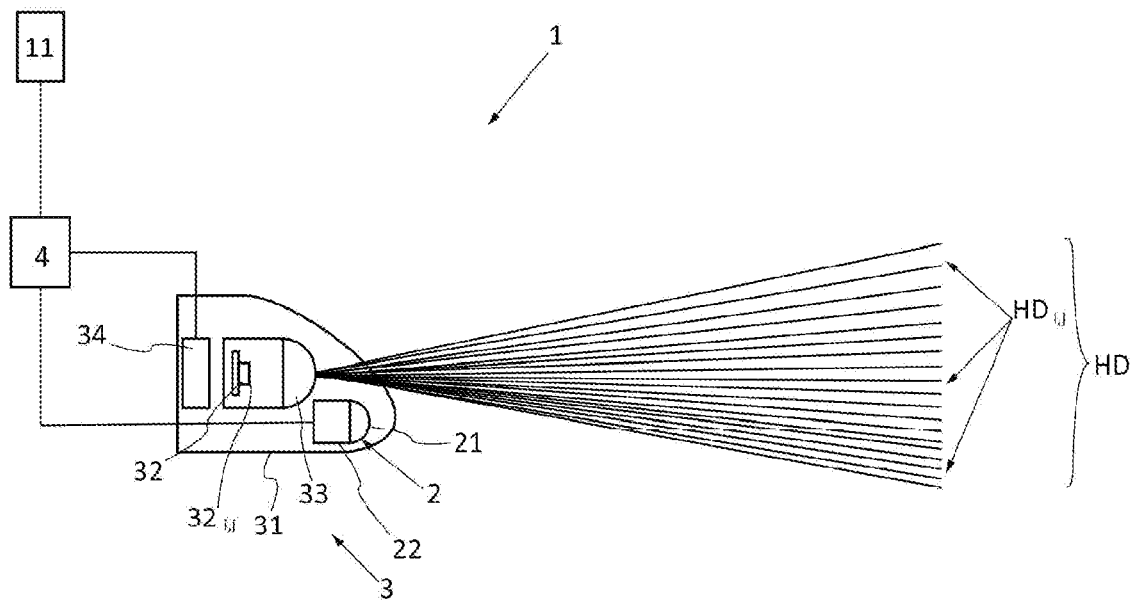
FIG. 1 shows, schematically and partially, a motor vehicle according to one embodiment of the invention.

FIG. 1 shows a partial view of a host motor vehicle 1 according to one embodiment of the invention. The host motor vehicle 1 comprises a sensor system 2 comprising a device 21, here a laser scanner. In the described example, the laser scanner 21 is located in a lighting system 3 taking the form of a front headlamp of the vehicle 1, and comprises a transceiver arranged to emit light through the outer lens of the headlamp 3 and to receive this light, after it has been reflected. The sensor system 2 further comprises a computer 22 arranged to implement various methods for processing the signals received by the transceiver of the laser scanner 21. The lighting system 3 of the host vehicle 1 comprises a light-emitting module 31. The light-emitting module 31 in particular comprises a pixelated light source 32 associated with a lens 33. In the described example, the pixelated light source 32 is a monolithic pixelated light-emitting diode, each of the light-emitting elements of which forms one elementary light source $32_{i,j}$ that is able to be selectively activated and controlled by an integrated controller so as to emit light toward the lens 33, which thus projects onto the road an elementary light beam $HD_{i,j}$ the light intensity of which is controllable. Each elementary light beam $HD_{i,j}$ is projected by the lens in a given emission cone defined by a given emission direction and a given opening angle. Thus, in the described example, all of the elementary light beams $HD_{i,j}$ thus form a pixelated light beam HD that contains 500 pixels in 25 columns and 20 rows, that lies vertically in an angular vertical range from −1° to +5°, and each pixel of which is formed by one of these elementary light beams $HD_{i,j}$.

Each elementary light beam $HD_{i,j}$ emitted by one of the elementary light sources $32_{i,j}$ of the source 32 has a vertical opening angle smaller than 1°. More specifically, the elementary light sources $32_{i,j}$ of the source 32 are arranged such that the vertical opening angle of the elementary light beams $HD_{i,j}$ that they are able to emit decreases with distance from the top of the pixelated light beam. In particular:

each of the elementary light sources the emission cone of which belongs to the angular vertical range from −1° to +1° is able to emit an elementary light beam the vertical opening angle of which is substantially 0.25°;

each of the elementary light sources the emission cone of which belongs to the angular vertical range from +1° to +2° is able to emit an elementary light beam the vertical opening angle of which is substantially 0.3°;

each of the elementary light sources the emission cone of which belongs to the angular vertical range from +2° to +3° is able to emit an elementary light beam the vertical opening angle of which is substantially 0.35';

each of the elementary light sources the emission cone of which belongs to the angular vertical range from +3° to +5° is able to emit an elementary light beam the vertical opening angle of which is substantially 0.4°.

The light-emitting module 31 comprises a controller 34 arranged to control the integrated controller of the pixelated light source 32 so as to selectively control turn-on, turn-off and modification of the light intensity of each of the elementary light beams $HD_{i,j}$ depending on instructions received from a controller 4 of the host vehicle 1, these instructions in particular being determined on the basis of information delivered by the computer 22 of the sensor system 2 and by a navigation system 11 of the host vehicle 1.

It will be noted that, in the described example, the laser scanner 21 and the light-emitting module 31 are located substantially at the same level.

Figure 2:
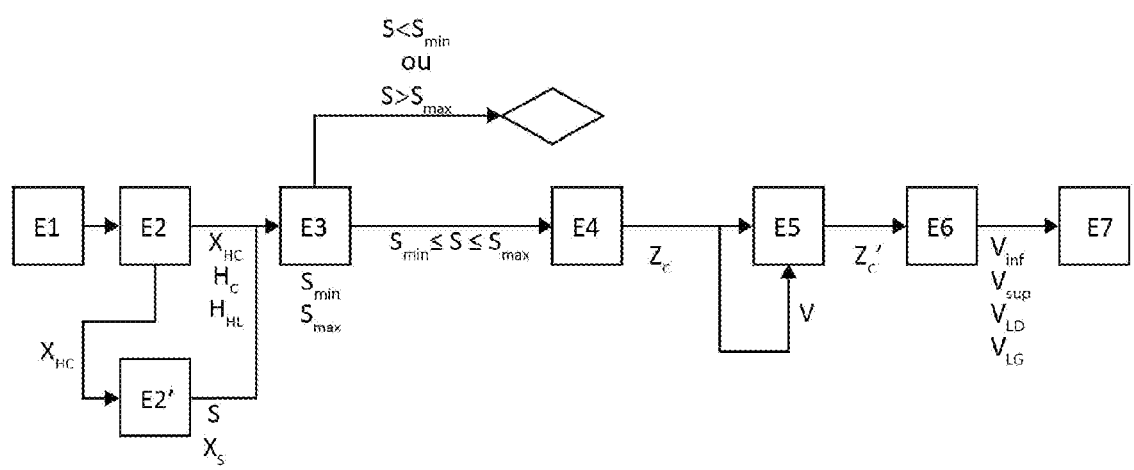
FIG. 2 shows a method according to one embodiment of the invention, implemented by the motor vehicle of FIG. 1.
Figure 3:
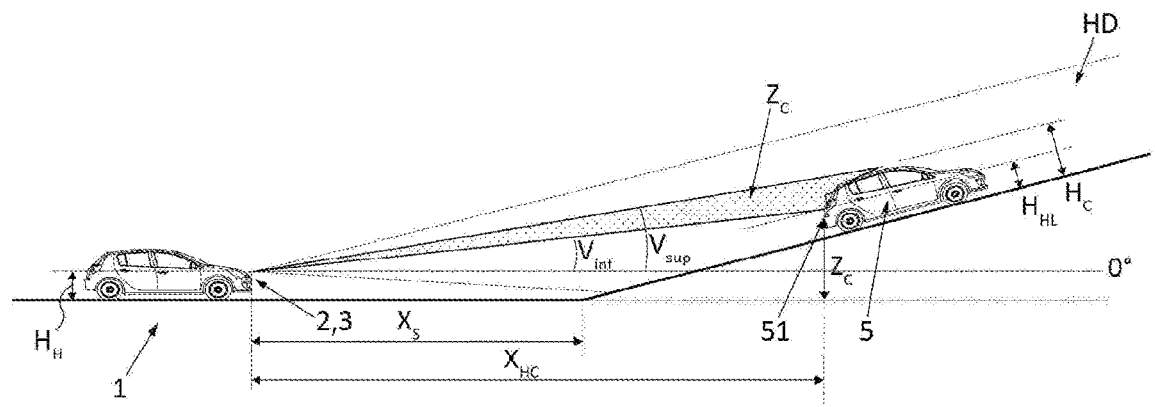
FIG. 3 shows a side view of a road scene during the implementation of the method of FIG. 2 by the vehicle of FIG. 1.
Figure 4:
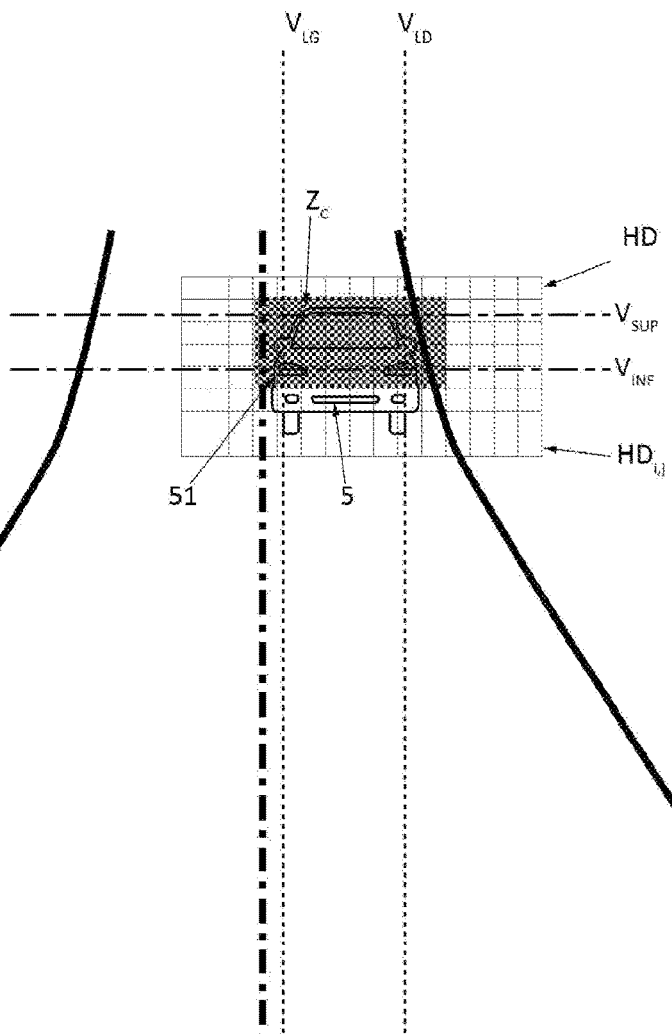
FIG. 4 shows a front view of a road scene during the implementation of the method of FIG. 2 by the vehicle of FIG. 1.

FIG. 2 shows a method for controlling the lighting system 3 of the host vehicle 1, which allows the lighting system 3 to emit a high light beam that will not cause a target object 5 discomfort glare, said method being implemented by the controller 4, and using the sensor system 2 and the navigation system 11. FIG. 3 shows a side view and FIG. 4 shows a front view of the road scene onto which this light beam is projected during the implementation of this method. It will be noted that FIG. 3 and FIG. 4 show only partial views of this light beam.

In a first step E1, the sensor system 2 detects the presence of a target object 5, in this case a target vehicle 5, on the road. In the described example, the computer 22 implements one or more methods for processing signals received by the transceiver of the laser scanner 21, allowing the target vehicle 5 to be detected. It will possibly for example be a question of methods for measuring the time of flight of the emitted light received, after reflection from the road or from an object on the road, by the transceiver of the laser scanner, and for analyzing this time of flight with a view to detecting the presence of the target vehicle.

In a second step E2, the computer 22 of the sensor system 2 computes the distance $X_{HC}$ separating the transceiver of the laser scanner 21 of the host vehicle from the target vehicle 5. Furthermore, the computer 22 classifies the type of the target vehicle among a set of predetermined types of vehicle and determines, on the basis of the selected type of the target vehicle 5, the height $H_C$ of the target vehicle 5 and the height $H_{HL}$ of the rear lights 51 of the target vehicle 5. Each of these operations may be performed by one or more algorithms for processing signals received by the transceiver of the laser scanner 21 and implemented by the computer 22. All of this information $X_HC$, $H_C$, $H_{HL}$ are transmitted by the computer 22 to the controller 4.

In a step E2', the navigation system 11 of the host vehicle transmits information relating to the road over which the host vehicle and the target vehicle 1 are traveling. In particular, the navigation system 11 determines the slope S of the road at the position of the target vehicle 5, on the basis of the known position of the host vehicle 1 and of the distance $X_{HC}$ that was transmitted to it by the controller 4. The navigation system also determines the distance $X_S$ between the host vehicle 1 and the start of the slope of the road over which the target vehicle 5 is traveling.

In a step E3, the controller 4 compares the value of the slope S with a lower threshold $S_{min}$, for example −13%, and with an upper threshold $S_{max}$, for example +13%. If the slope is not comprised between $S_{min}$ and $S_{max}$, the method stops, insofar as it is possible to deduce that the host and target vehicles 1, 5 are traveling on a road the slope of which will not allow or will not require a glare-preventing high-beam function. In the case where the slope S is comprised between $S_{min}$ and $S_{max}$, the method proceeds to the following step.

In a step E4, the controller 4 determines a relative height $Z_C$ between the lighting system 3 of the host vehicle 1 and the rear lights 51 of the target vehicle 5, by means of the following equation:

$$Z_C = \frac{H_{HL}}{\sin(\frac{\pi}{2} - S)} + \tan(S) \cdot (X_{HC} - X_S) + H_H \quad \text{[Math 4]}$$

where $Z_C$ is the relative height between the host vehicle 1 and the target vehicle 5, Him is the height of rear lights 51 of the target vehicle 5, S is the slope of the road over which the target vehicle 5 is traveling, $X_{HC}$ is the distance separating the host vehicle 1 and the target vehicle 5, $X_S$ is the distance separating the host vehicle 1 from the start of the slope of the road on which the target vehicle 5 is located and $H_H$ is the height of the sensor system 2 of the host vehicle 1.

The relative height $Z_C$ determined by the controller 4 is relative to the position of the target vehicle 5 at the time t of its detection by the computer 22. However, the various methods implemented by the computer 22 of the sensor system 2 and the steps of the method according to the invention, which will be described below, and which allow a glare-preventing high beam to be generated by the lighting system 3, require a given execution time $\Delta T$, after which the beam is actually emitted. During this time $\Delta T$, the target vehicle 5 may have moved such that the value of the relative height $Z_C$ no longer corresponds to the actual position of the target vehicle 5 when the beam is emitted.

In order to compensate for this latency, in a step E5, the controller 4 predicts a value of a relative height $Z_C'$ between the host vehicle 1 and the rear lights 51 of the target vehicle 5 at a future time $t+\Delta t$ with respect to the time t of detection by the computer 22 of the target vehicle 5 in step E1. To these ends, the controller 4 determines a vertical speed $\dot{Z}$ of the target vehicle 5, via differentiation of the various values of the vertical height $Z_C$ determined beforehand in steps E4. The predicted value $Z_C'$ may thus be obtained by means of the following equation:

$$Z'_C = Z_C + \dot{Z} \cdot \Delta t \quad \text{[Math 5]}$$

where $Z_C$ is the value of the relative height at the time t, i.e. the value determined in step E4, $Z_C'$ is the predicted value of the relative height at the future time $t+\Delta t$, $\dot{Z}$ is the vertical speed of the target vehicle 5 and $\Delta t$ is the latency time of the method according to the invention.

In a step E6, the controller 4 determines a lower angle $V_{inf}$ between the light-emitting module 31 and the rear lights 51 of the target vehicle 5, by means of the following equation:

$$V_{inf} = \tan^{-1}(\frac{Z'_C}{X_{HC}}) \quad \text{[Math 6]}$$

where $V_{inf}$ is the lower angle, $Z'_C$ is the relative height predicted in step E5 and $X_{HC}$ is the distance separating the host vehicle 1 and the target vehicle, which distance is determined in step E2.

Moreover, still in step E6, the controller 4 determines an upper angle $V_{sup}$ on the basis of the value of the lower angle $V_{inf}$ obtained beforehand and of the height of the target vehicle $H_C$ determined in step E2, for example using the following equation:

$$V_{sup} = \tan^{-1}\left(\frac{H_C - H_{HL}}{X_{HC}}\right) + V_{inf} \quad \text{[Math 7]}$$

where $V_{sup}$ is the upper angle, $H_{HL}$ is the height of the rear lights 51 of the target vehicle 5, $X_{HC}$ is the distance separating the host vehicle 1 and the target vehicle 5, $H_c$ is the height of the target vehicle 5 and $V_{inf}$ is the value of the lower angle.

At the end of step E6, the controller 4 transmits the pair of lower and upper angles Via, $V_{sup}$ to the controller 34 of the light-emitting module 31. Furthermore, in steps that are not described, the controller 4 determines a pair of right and left lateral angles $V_{LD}$, $V_{LG}$, respectively, on the basis of the positions of the rear lights 51 of the target vehicle 5 and also transmits this pair of angles to the controller 34.

In a step E7, the controller 34 selects those elementary light sources $32_{i,j}$ of the light source 32 which are able to emit elementary light beams $HD_{i,j}$ whose emission cones are vertically at least partially between the lower $V_{inf}$ and upper $V_{sup}$ angles and horizontally at least partially between the right $V_{LD}$ and left $V_{LG}$ lateral angles. The controller 34 thus controls the turning-off of these selected elementary light sources $32_{i,j}$ while controlling the turning-on of the other elementary light sources. The light-emitting module 1 thus emits a pixelated high light beam HD in which is formed a dark region $Z_C$ that is centered on the target vehicle 5 and defined vertically by lower and upper cut-offs that each make a vertical angle to the light-emitting module 1, and the respective values of which are substantially $V_{inf}$ and $V_{sup}$; and that is defined horizontally by right and left lateral cut-offs that each make a horizontal angle to the light-emitting module 1, and the respective values of which are substantially $V_{LD}$ and $V_{LG}$. It will be noted that the term "substantially" must here be interpreted with regard to the vertical and horizontal resolutions of the pixelated light beam HD.

The above description clearly explains how the invention allows the objectives that were set therefor to be achieved, in particular by providing a method for controlling a lighting system of a host vehicle that controls turn-on or turn-off of the elementary light sources of the lighting system so as to generate, in a pixelated light beam, a dark region bounded by an upper cut-off and a lower cut-off the positions of which are determined on the basis of information output from a sensor system of the host vehicle, and in particular information relating to the vertical position, on the road, of a target object to not be subject to discomfort glare.

In any event, the invention should not be regarded as being limited to the embodiments specifically described in this document, and extends, in particular, to any equivalent means and to any technically operative combination of these means. In particular, it is possible to envisage types of light-emitting module other than the one described, and in particular a light-emitting module comprising an association of a light source and of a digital micromirror device. It will also be possible to envisage other methods for determining the various values used in the equations that allow the values of the lower and upper angles to be determined, or even equations other than those which have been described, and in particular equations integrating margins that allow the position of the upper and lower cut-offs of the dark region in the pixelated light beam to be moved vertically.

What is claimed is:

1. A method for controlling a lighting system of a host motor vehicle, the lighting system including a plurality of selectively controllable elementary light sources, each elementary light source being able to emit an elementary light beam the vertical opening angle of which is smaller than 10, the method comprising: detecting a target object by means of a sensor system of the host vehicle; determining a relative distance between a given point of the sensor system of the host vehicle and a detected point of the target object and determining a slope of the road on which the target object is located; determining, on the basis of the relative distance and of the slope, a lower angle and an upper angle between a given point of the lighting system of the host vehicle and an upper cut-off and a lower cut-off that are together intended to vertically border the target object; controlling the elementary light sources of the lighting system of the host vehicle so as to emit a pixelated high light beam, some of the elementary light sources being controlled, depending on the lower and upper angles, so as to generate, in the high light beam, a dark region extending substantially between the upper and lower cut-offs.

2. The method as claimed in claim 1, wherein determining the lower and upper angles includes comparing the slope with a lower threshold and an upper threshold.

3. The method as claimed in claim 1, wherein determining the lower and upper angles includes determining, on the basis of the relative distance and of the slope, a relative height between the given point of the lighting system of the host vehicle and a given point of the target object at which the lower cut-off must be positioned, with the lower and upper angles being determined on the basis of the relative distance, of the slope and of the relative height.

4. The method as claimed in claim 3, wherein determining the lower and upper angles includes predicting a value of the relative height at a future time with respect to the given time.

5. The method as claimed in claim 4, wherein the predicting of the value of the relative height at a future time includes determining a vertical speed of the target object.

6. The method as claimed in claim 3, wherein the value of the lower angle is determined responsive to the relative height and the relative distance.

7. The method as claimed in claim 1, wherein determining the lower and upper angles includes determining the height of the target object, with the value of the upper angle being determined responsive to the value of the lower angle and the determined height.

8. The method as claimed in claim 1, wherein detecting the target object includes classifying the type of the target object among a set of predetermined types of target object.

9. The method as claimed in claim 1, wherein controlling the elementary light sources of the lighting system of the host vehicle includes turning off certain elementary light sources that are each capable of emitting one elementary light beam between the upper and lower cut-offs.

10. A motor vehicle including a sensor system, a lighting system and a controller, with the controller being configured to implement a method, the method comprising: detecting a target object by means of the sensor system; determining a relative distance between a given point of the sensor system and a detected point of the target object and determining a slope of the road on which the target object is located; determining, on the basis of the relative distance and of the slope, a lower angle and an upper angle between a given point of the lighting system and an upper cut-off and a lower cut-off that are together intended to vertically border the target object;
controlling elementary light sources of the lighting system so as to emit a pixelated high light beam, some of the elementary light sources being controlled, depending on the lower and upper angles, so as to generate, in the high light beam, a dark region extending substantially between the upper and lower cut-offs.

* * * * *